US008676950B2

(12) United States Patent
Tombroff et al.

(10) Patent No.: US 8,676,950 B2
(45) Date of Patent: Mar. 18, 2014

(54) INDEPENDENT RESTARTING OF THE NODES OF A PEER-TO-PEER NETWORK

(75) Inventors: Dimitri Tombroff, Massy (FR); Thierry Godfroid, L'Etang la Ville (FR)

(73) Assignee: Alcatel Lucent, Paris (FR)

( * ) Notice: Subject to any disclaimer, the term of this patent is extended or adjusted under 35 U.S.C. 154(b) by 439 days.

(21) Appl. No.: 12/966,314

(22) Filed: Dec. 13, 2010

(65) Prior Publication Data

US 2011/0167143 A1 Jul. 7, 2011

(30) Foreign Application Priority Data

Jan. 4, 2010 (FR) .................................... 10 50002

(51) Int. Cl.
*G06F 15/173* (2006.01)
*G06F 15/16* (2006.01)

(52) U.S. Cl.
USPC ............ 709/223; 709/224; 709/227; 370/400

(58) Field of Classification Search
USPC ........... 709/223–224, 227–228; 370/400–401
See application file for complete search history.

(56) References Cited

U.S. PATENT DOCUMENTS

| | | | | |
|---|---|---|---|---|
| 6,202,079 B1 * | 3/2001 | Banks | ............................ | 718/101 |
| 6,247,038 B1 * | 6/2001 | Banks et al. | ................... | 718/100 |
| 7,313,565 B2 * | 12/2007 | Zhang et al. | ........................... | 1/1 |
| 7,333,824 B2 * | 2/2008 | Zhang et al. | ................... | 455/502 |
| 7,441,180 B1 * | 10/2008 | Kaczmarek et al. | .......... | 715/201 |
| 7,774,495 B2 * | 8/2010 | Pabla et al. | .................... | 709/238 |
| 7,852,767 B2 * | 12/2010 | Twiss | ............................. | 370/235 |
| 7,900,082 B2 * | 3/2011 | Strauss et al. | .................. | 714/4.1 |
| 7,945,680 B2 * | 5/2011 | LoGalbo et al. | ............... | 709/227 |
| 8,051,205 B2 * | 11/2011 | Roy et al. | ........................ | 709/238 |
| 8,117,305 B2 * | 2/2012 | Nagoya et al. | ................. | 709/224 |
| 8,380,872 B2 * | 2/2013 | Margolis et al. | ............... | 709/227 |
| 2003/0018930 A1 * | 1/2003 | Mora et al. | ........................ | 714/42 |
| 2003/0233648 A1 | 12/2003 | Earl et al. | | |
| 2008/0273541 A1 * | 11/2008 | Pham | ............................ | 370/400 |
| 2009/0287827 A1 * | 11/2009 | Horn et al. | ..................... | 709/227 |
| 2011/0106837 A1 * | 5/2011 | Walton et al. | .................. | 709/224 |

FOREIGN PATENT DOCUMENTS

EP        2066076 A1    6/2009

OTHER PUBLICATIONS

Ajmani, Saheer et al: "Modular Software Upgrades for Distributed Systems", Jan. 1, 2006, ECOOP 2006—Object-Oriented Programming Lecture Notes in Computer Science;;LNCS, Springer, Berlin, DE, pp. 452-476, XP019041419, ISBN: 978-3-540-35726-1.
Brewer, Eric A., "Lessons from Giant-Scale Services", IEEE Internet Computing. vol. 5, No. 4. pp. 46-55. Jul./Aug. 2001. XP007914531.

(Continued)

*Primary Examiner* — Bharat N Barot
(74) *Attorney, Agent, or Firm* — Harness, Dickey & Pierce

(57) ABSTRACT

A method for restarting a set of nodes forming a peer-to-peer network. The method includes determining a first node of the set of nodes to be restarted and a subset of nodes known to the first node. Each node in the set of nodes to be restarted, prior to restarting, is configured to select a node and transmitting a message to the known nodes, containing an identifier of the selected node. Upon receiving the message, each known node is configured to back up duplicate sessions by determining sessions duplicated between the known node and the node in the set of nodes to be restarted and duplicating the sessions determined to be duplicate and verifying whether the known node is the next node, based on the message's content, and if the known node is the next node selecting the known node as a next node to be restarted.

5 Claims, 1 Drawing Sheet

(56) References Cited

OTHER PUBLICATIONS

Panta, R., and Bagchi, S. "Hermes: Fast and Energy Efficient Incremental Code Updates for Wireless Sensor Networks", IEEE Infocom 2009.

Stoica, Ian et al., "Chord: A scalable peer-to-peer Lookup Service for Internet Applications", ACP SIGCOMM 2001, San Diego, CA, Aug. 2001; pp. 149-160.

Yu, Haifeng et al., "Availability of multi-object operations", Proc. of the Third USENIX Symp. on Networked Systems Design and Implementation, pp. 211-224, San Jose, CA, May 2006.

* cited by examiner

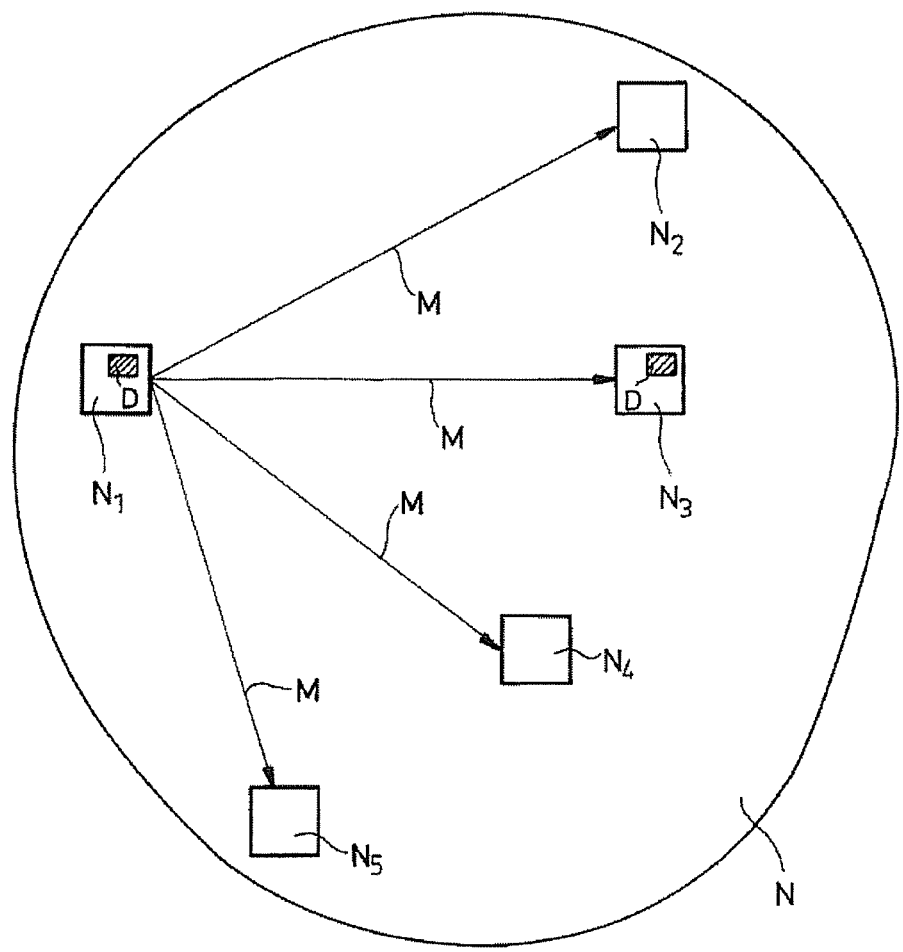

INDEPENDENT RESTARTING OF THE NODES OF A PEER-TO-PEER NETWORK

BACKGROUND

The present invention relates to peer-to-peer networks. These networks are made up of a set of interconnected nodes capable of self-management.

These peer-to-peer networks may be used for different applications, particularly telecommunications. For some of these applications, the nodes must save data. This data may be data relating to a communication session and must then be found again for any new event belonging to the same session A peer-to-peer network may be used as a distributed memory, and each node saves some of the data which is accessible via a distributed hash table.

Some applications require a high fault tolerance. Thus, in order to keep the failure of one of the network's nodes from irreversibly destroying the portion of the data that it was saving, that data may be duplicated on another node. This conventional redundancy mechanism, known as "buddy replication", allows the system to tolerate most faults that affect the peer-to-peer network.

One implementation of the peer-to-peer network is explained in greater detail in the article "Chord: A scalable peer-to-peer Lookup Service for Internet Applications" by Ian Stoica, Robert Morris, David Karger, M. Frans Kaashoek and Hari Balakrishanan, ACP SIGCOMM 2001, San Diego, Calif., August 2001; pp. 149-160

There are articles which describe methods for improving fault-tolerance in a "Chord" network. For example, the article "Availability of multi-object operations" by Haifeng Yu, Philip B. Gibbons and Suman Nath suggests examining how data is duplicated in such a network.

Each of the network's nodes contains software modules that enable the system to function. These software modules enable the nodes to communicate using a predefined protocol, to process requests from other nodes or from systems outside the peer-to-peer network, to manage the duplication of data, etc.

From time to time, these software modules may need to be changed or updated. The software update mechanisms require temporarily shutting down the nodes, even if all that is being done is installing a new version that only corrects a minor problem, or provides a new but secondary feature.

However, in a peer-to-peer network, this restarting poses two problems.

First, since the nodes had saved data, this data must be retained during the restart phase.

Second, for some applications such as telecommunications applications, it is critical to ensure the peer-to-peer network's continuity of service. In other words, during the restarting of the nodes, the peer-to-peer network must continue to operate and provide the intended application service transparently for the devices of that service's users.

SUMMARY OF THE INVENTION

The purpose of the present invention is to resolve these two problems.

To do so, it consists of a method for restarting a peer-to-peer network made up of a set of nodes. This method is innovative in that comprises a step of determining a first node to be restarted and a set of nodes known to said node to be restarted; wherein each node to be restarted implements, prior to restarting:

a step of electing a node from among the known nodes, a step of the node to be restarted transmitting a message to the known nodes, containing an identifier of the next node (elected during the previous step);

and in that upon receiving the message, each node implements:

a step of backing up duplicate sessions, consisting of determining duplicate sessions between that node and the node to be restarted, and of duplicating them again, a step of verifying whether that node is the next node, based on the message's content, and if so to consider the node in question as a node to be restarted.

According to one embodiment of the invention, the step of backing up consists of waiting until the node to be restarted has restarted, then duplicating the duplicated sessions onto it.

The message may also contain an identifier of the next node, and if so, the step of backing up consists of duplicating the duplicate sessions onto any one of the known nodes, except onto the next node and the node to be restarted.

The step of election may consist of determining a next node from among the nodes deployed on a processing device that is different from the one on which the node to be restarted is deployed.

A further object of the invention is a peer-to-peer network comprising a plurality of nodes, at least some of these nodes implementing the previously described method.

Thus, the invention proposes a mechanism for sequentially restarting the nodes combined with a strategy for dynamically redeploying the data duplicated within the network. At all times, the nodes not being restarted are sufficient to provide the application service.

Additionally, the mechanism needs no human intervention: each node automatically determines a next node to be restarted.

Additionally, the nodes can implement this mechanism independently. It requires no centralized or outside devices.

BRIEF DESCRIPTION OF THE DRAWINGS

The invention and its benefits will become more clearly apparent in the following description with reference to the attached drawings, which schematically depicts a peer-to-peer network.

FIG. 1 illustrates an example of a peer-to-peer network according to example embodiments.

DETAILED DESCRIPTION

The peer-to-peer network N depicted in FIG. 1 is made up of nodes N1, N2, N3, N4, N5. Each piece of data saved within a node is duplicated in another separate node. Thus, the data D saved within the node N1 is duplicated in the node N3. This way, if the node N1 fails, this data D will still be available within the peer-to-peer network N.

Besides this data, the nodes have software modules.

These software modules are used to implement of the special mechanisms and algorithms that manage the peer-to-peer network. These special mechanisms and algorithms may, for example, be the ones which comply with the "Chord" document cited above.

According to the invention, it additionally has software modules configured to update the previously mentioned software modules.

As we shall see, these software modules comprise two functions: one triggered when a restart message is received, and the other at the restart time.

It is assumed that all of the nodes have the same software modules. This assumption makes it possible to simplify the outline of the invention, but the invention may be adapted to apply to a network comprising differentiated nodes.

The inventive method comprises a first step of determining a first node to start.

This initialization of the method is done by an outside device transmitting a message to the determined node. This outside device may be a control console of the peer-to-peer network, whereby the programmer may trigger the updating or replacement of the software modules embedded on the nodes.

This message is received by the determined node, and causes the triggering of a restart function.

This restart function comprises a step of electing a next node from among the nodes known to the determined node.

This set of known nodes is, when started up, equal to the set of nodes. However, as the restarts proceed, the two sets will diverge. This is because when a node restarts, it gets a new identity, and although it is the same machine, it is functionally a different node. Consequently, over the course of the inventive method, there will be fewer and fewer nodes belonging to that initial set of known nodes.

Within that (initial) set of known nodes, it must elect the node which will restart after itself. This choice may be made using different criteria.

One effective criterion is electing a node deployed on a processing device distinct from its own. This is because in a peer-to-peer network, the nodes are deployed on a set of machines or processing devices which are generally less numerous than the nodes. In fact, multiple nodes are normally deployed on a single machine. In order to avoid load imbalances on the network R during the restart process, it is beneficial to distribute the restarting of the nodes over time depending on the processing devices. This option prevents a situation in which some machines, at a given moment, have many more nodes than others, thereby causing a loss of system performance.

Another implementation may consist of following the ring of a distributed hash table (DHT) deployed on the peer-to-peer network. These two implementations may also be combined.

Other alternatives, naturally, are also possible, but it is important to note that the next node is determined by the peer-to-peer network's nodes themselves, without the involvement of an outside, centralized device. One of the benefits of the invention is providing a fully independent process managed by the peer-to-peer network.

A second step of the restart function is a step of transmitting a message M to the subset of known nodes. This message contains an identifier of the next node. It may also contain an identifier of the determined node (the sender of the message) and an identifier of the nodes in the subset of known nodes.

Once the set of messages M has been correctly transmitted, the node can restart. As is known to a person skilled in the art, a restart may comprise several preprocessing operations such as terminating open communication channels (i.e. sockets) with the other nodes, etc.

The restart function may correspond to a critical section during which the node stops creating new sessions.

The inventive method also comprises a receipt function, triggered by receiving a message as previously described.

This receipt function comprises a step of backing up the duplicated sessions. This step consists of first determining the affected sessions, meaning those which are duplicated between the node that received the message and the node that sent it. It is not important to know which nodes have the "primary" version and which have a copy; it is only important to determine the sessions which are duplicated between these two nodes.

As the sending node must restart, one of the two copies will end up disappearing from the peer-to-peer network, and the challenge is maintaining redundancy of information, even during that network N startup phase.

To do so, several embodiments are possible.

In a first embodiment, the node waits until the sending node has restarted. Whenever the sending node has become active again, it triggers a step of duplicating the previously determined session data onto the sending node.

In a second embodiment, the node triggers the determination of a safe node and duplicates the session data onto that safe node.

This safe node may be any node in the subset of known nodes, except for the sending node, and the next node to be restarted (which may be transmitted as a message parameter).

The receipt function also comprises a step of verifying whether the receiving node is the next node determined by the sending node. To do so, the next node's identifier must be included within the message. In this situation, the receiving node must be considered a node to be restarted, and consequently, the restart function is automatically triggered.

The process ends once all of the nodes have restarted, i.e. when there are no longer any nodes left belonging to the initial set of known nodes (all of them have restarted and changed identity).

By way of the inventive method, the session data is saved and available throughout the process, and the peer-to-peer network remains operational. Furthermore, the session data remains duplicated, and the peer-to-peer network continues to meet the fault-tolerance requirements.

The invention claimed is:

1. A method for restarting a set of nodes forming a peer-to-peer network, the method comprising:
   determining a current node of the set of nodes to be restarted; and
   determining known nodes that are known to the current node; wherein
   each node in the set of nodes to be restarted, prior to restarting, is configured as a transmitting node and implements a transmitting process of,
      selecting a node from among the known nodes as a selected node, and
      transmitting, from the transmitting node in the set of nodes to be restarted, a message to the known nodes, containing an identifier of the selected node; and
   upon receiving the message at receiving known nodes, each receiving known node is configured to implement a restart process of,
      backing up, at one of the known nodes other than the receiving known node, sessions determined as duplicative between the receiving known node and the transmitting node in the set of nodes to be restarted, and
      restarting the receiving known node if the message indicates that the receiving known node is the selected node.

2. A method according to claim 1, wherein said backing up comprises:
   waiting until the transmitting node has restarted, then duplicating, by the receiving known node, the sessions determined as duplicative onto the transmitting node.

3. A method according to claim 1, wherein said backing up comprises:

duplicating, by the receiving known node, said sessions determined as duplicative onto any one of said known nodes, except the receiving known node and the selected node.

4. A method according to claim 1, wherein the selecting comprises:

determining, by the transmitting node, the selected node from among the nodes deployed on a processing device different from a processing device on which the transmitting node is deployed.

5. A peer-to-peer network comprising:

a plurality of nodes, at least some of the plurality of nodes being configured as receiving known nodes to implement a process, upon receiving a message from a transmitting node to be restarted, the message containing an identifier of a selected node to restart after the transmitting node, and the process including, backing up, at one of the known nodes other than the receiving known node, sessions determined as duplicative between the receiving known node and the transmitting node, and restarting the receiving known node if the message indicates that the receiving known node is the selected node.

* * * * *